US009341316B2

(12) United States Patent
Novak

(10) Patent No.: US 9,341,316 B2
(45) Date of Patent: May 17, 2016

(54) LEAK DETECTION, CONTAINMENT AND CUTTOFF SYSTEM FOR A PIPELINE OR OTHER CONDUIT

(71) Applicant: Robert J. Novak, Regina (CA)

(72) Inventor: Robert J. Novak, Regina (CA)

( * ) Notice: Subject to any disclaimer, the term of this patent is extended or adjusted under 35 U.S.C. 154(b) by 334 days.

(21) Appl. No.: 14/031,293

(22) Filed: Sep. 19, 2013

(65) Prior Publication Data

US 2014/0076423 A1 Mar. 20, 2014

Related U.S. Application Data

(60) Provisional application No. 61/702,874, filed on Sep. 19, 2012.

(51) Int. Cl.
*F16K 31/12* (2006.01)
*F17D 5/02* (2006.01)

(52) U.S. Cl.
CPC ............ *F17D 5/02* (2013.01); *Y10T 137/7723* (2015.04)

(58) Field of Classification Search
CPC ............... F17D 5/02; F17D 5/04; F17D 5/06; Y10T 137/7723; Y10T 137/8158; Y10T 137/5762; G01M 3/165; G01M 3/182; G01M 3/045
See application file for complete search history.

(56) References Cited

U.S. PATENT DOCUMENTS 3,299,417 A * 1/1967 Sibthorpe ............ B21C 37/151 138/114
3,721,898 A * 3/1973 Dragoumis .......... G01M 3/045 138/104
3,741,233 A * 6/1973 Smith, Jr. ................. F17D 5/02 137/115.05
3,976,312 A * 8/1976 Murphree ............ F16L 51/027 285/226
4,259,553 A * 3/1981 Tanaka ................. F16L 11/125 138/103
4,511,162 A * 4/1985 Broyles .............. G01M 3/2861 285/226
5,190,069 A * 3/1993 Richards ................ G01M 3/18 137/312
5,203,202 A * 4/1993 Spencer ................. G01M 3/18 73/40
6,026,862 A * 2/2000 Friedrich ................. F16L 9/18 138/104
6,105,676 A * 8/2000 Alhamad ................ A62C 3/06 169/45
6,446,661 B2 * 9/2002 Armenia ................ F16L 11/20 137/312
7,453,367 B2 * 11/2008 Spaolonzi ............ G01M 3/047 340/603
7,509,841 B2 * 3/2009 Spaolonzi ............ G01M 3/047 138/104

FOREIGN PATENT DOCUMENTS

DK EP 2407631 A1 * 1/2012 ............. E21B 33/06

* cited by examiner

*Primary Examiner* — Jessica Cahill
(74) *Attorney, Agent, or Firm* — Kyle R. Satterthwaite; Ryan W. Dupuis; Ade & Company Inc.

(57) ABSTRACT

A pipeline leak detection, containment and cutoff system features a flexible tubular jacket fitted circumferentially around the pipeline for expansion by leaking fluid. A coil is wrapped on the jacket and has a terminal fitting that normally resides in an engaged position maintain a predetermined state of a control circuit that connected to a valve installed on the pipeline. When the jacket expands under the action of fluid leaking from the pipeline, this increases the coil diameter a the expanding area of the jacket, which pulls the terminal fitting from its engaged position, thereby changing the state of the control circuit and causing the valve to close the pipeline and prevent further leakage from same. Preferably multiple valves installed along the pipeline are wired in series such that control circuit closes all the valves under a change in the control circuit by any one of the coils.

17 Claims, 4 Drawing Sheets

FIG. 4
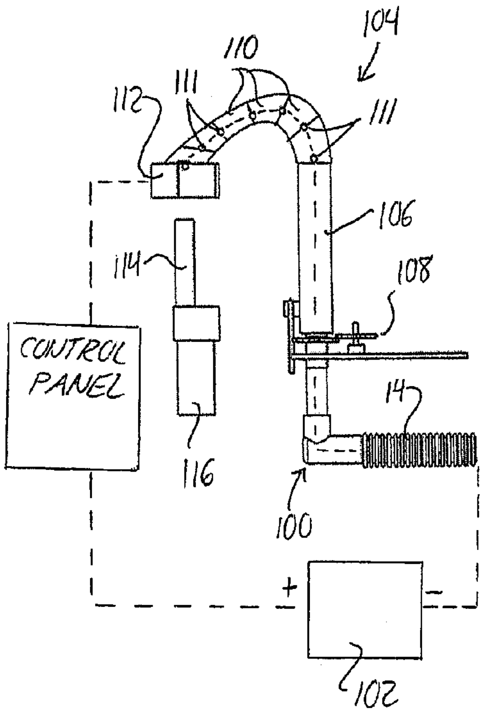
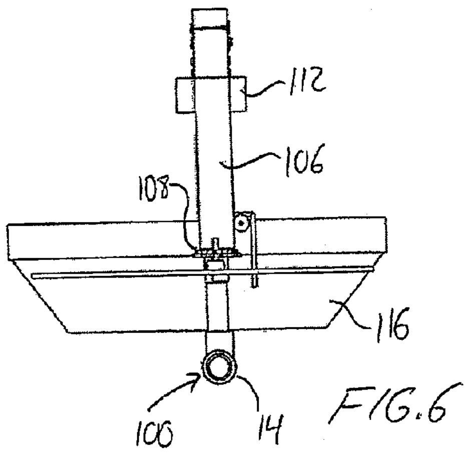
FIG. 6
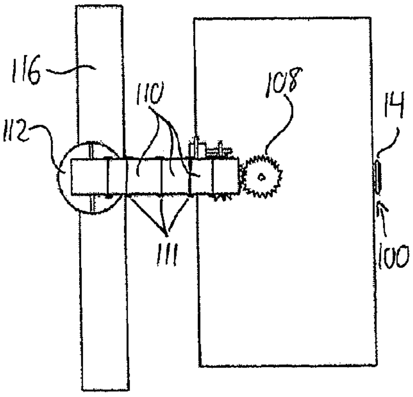
FIG. 5

LEAK DETECTION, CONTAINMENT AND CUTTOFF SYSTEM FOR A PIPELINE OR OTHER CONDUIT

CROSS REFERENCE TO RELATED APPLICATIONS

This application claims benefit under 35 U.S.C. 119(e) of Provisional Application Ser. No. 61/702,874, filed Sep. 19, 2012, the entirety of which is incorporated herein by reference.

FIELD OF THE INVENTION

The present invention relates generally to leak response systems for pipelines or other conduits, and more particularly to a system configured to both contain a leak and cut off flow through the conduit in response to that leak.

BACKGROUND OF THE INVENTION

In recent years, environmental issues have come to the forefront in terms of both public awareness and governmental and private sector action. Regarding the oil and gas industry, concern has risen over the potential for environmental contamination by pipeline leaks.

Applicant has developed a unique solution for containing pipeline leaks, and shutting down pipeline flow and alerting pipeline personnel in response to occurrence of such leaks.

SUMMARY OF THE INVENTION

According to a first aspect of the invention there is provided a leak detection, containment and cutoff system for a conduit, the system comprising:

a flexible tubular jacket fitted circumferentially around a circumferential wall of the conduit so as to be expandable by fluid exiting the conduit in the event of a leak occurring in the conduit at a location beneath the tubular jacket;

a valve installed at a point along the conduit and moveable between open and closed positions allowing and preventing fluid flow through the conduit at said point; and a control system configured to move the valve into the closed position under expansion of the tubular jacket by the fluid leaking from the conduit.

Preferably the control system comprises a coil wrapped around and along the flexible tubular jacket and having a terminal fitting at an end thereof, the terminal fitting normally residing in a first relationship with a control element in a control circuit of the control system and being movable into to a second relationship with the control element by expansion of a diameter of the coil caused by the expansion of the tubular jacket at the leak in the conduit, the terminal fitting and the control element being arranged to maintain the valve in the open position when in the first relationship and to move the valve to the closed position when in the second relationship.

The control element may be a quick-disconnect coupler in which the terminal fitting of the coil is normally engaged to close the control circuit and from which the terminal fitting is disengagable from the quick-disconnect coupler by the expansion of the coil to open the control circuit, the control system being configured to move the valve into the closed position under opening of the control circuit.

The control circuit may normally power at least one actuator that normally holds the valve in the open position, whereby opening of the control circuit disconnects power to actuator to release the valve from the open position.

There is preferably provided an emergency alarm system linked to the control system and operable to activate at least one alarm output in response to the expansion of the tubular jacket and resulting closing of the valve.

The at least one alarm output may comprise an emergency indicator light.

The at least one alarm output may comprise an image capture device arranged to capture at least one image of at least one of the tubular jacket and the valve.

There may be provided a communication network connection between the image capture device and a remote monitoring device for conveying the at least one image to the remote monitoring device.

The conduit may be an oil pipeline. Alternatively, the pipeline may be a propane or natural gas pipeline.

There may be provided a flashback arrestor installed on the conduit proximate the valve.

There may be provided a second flashback arrestor installed on the conduit proximate the valve, the flashback arrestors being respectively positioned upstream and downstream of the valve.

Each flashback arrestor may be mounted at an end of a pipe that is disposed opposite another end of the pipe at which the valve is mounted between said pipe and another pipe of the conduit.

According to a second aspect of the invention there is provided a leak detection and containment system for a conduit, the system comprising:

a flexible tubular jacket fitted circumferentially around a circumferential wall of the conduit so as to be expandable by fluid exiting the conduit in the event of a leak occurring in the conduit at a location beneath the tubular jacket;

a coil wrapped around and along the flexible tubular jacket and having a terminal fitting at an end thereof;

a leak event response system comprising a control circuit having a control element in association with the terminal fitting of the coil, the terminal fitting normally residing in a first relationship with a control element and being movable into to a second relationship with the control element by expansion of a diameter of the coil caused by the expansion of the tubular jacket at the leak in the conduit, the leak response system being configured to trigger and output action under movement of the terminal fitting of the coil into the second relationship with the control element.

The leak event response system may comprise a valve installed at a point along the conduit and moveable between open and closed positions allowing and preventing fluid flow through the conduit at said point, the valve being normally maintained in the open position and arranged to move to the closed position under movement of the terminal fitting of the coil into the second relationship with the control element.

According to a third aspect of the invention there is provided a leak detection and indication system for a conduit comprising a flexible tubular jacket fitted circumferentially around a circumferential wall of the conduit so as to be expandable by fluid exiting the conduit in the event of a leak occurring in the conduit at a location beneath the tubular jacket, whereby expansion of the flexible tubular jacket indicates the occurrence of the leak.

BRIEF DESCRIPTION OF THE DRAWINGS

In the accompanying drawings, which illustrate exemplary embodiments of the present invention:

FIG. 4 is a schematic illustration of a pipeline employing the leak containment and response system of the present invention from a side elevational viewpoint of a filling station for filling of a tanker ship at a sea port.

FIG. 5 is an overhead plan view of the filling station of FIG. 4.

FIG. 6 is an elevational view of the filling station of FIG. 4 from another side thereof.

DETAILED DESCRIPTION

Figure 1:
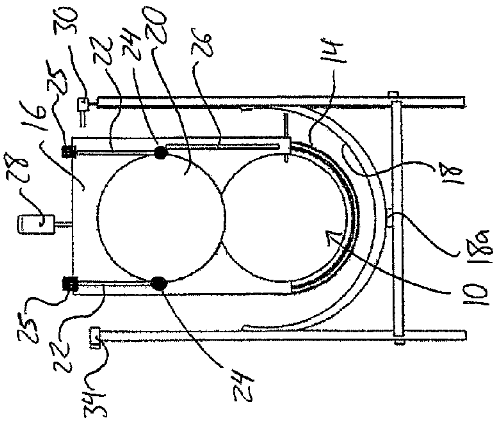
FIG. 1 is an end elevational view of a pipeline section with a leak containment and response system of the present invention from a first end of the pipeline section.

FIG. 1 shows a single pipeline section of the present invention, where a length of pipe 10 is circumferentially surrounded by a sleeve-shaped jacket 12 of rubber or other flexible material conforming to the exterior surface of the pipe wall. A length of electrically conductive wire 14 is wrapped around the exterior of the jacket to helically coil therearound, thereby circumferentially and longitudinally traversing the length of pipe 10. A valve support 16 is mounted at an end of the pipe 10, and a trough of U-shaped cross-section forms a section of a catch basin 18 that underlies the pipeline beneath the pipe 10 and valve support 16. A removable oil drain plug **18*a*** normally closes a drain port at the lower apex of the trough.

Figure 2:
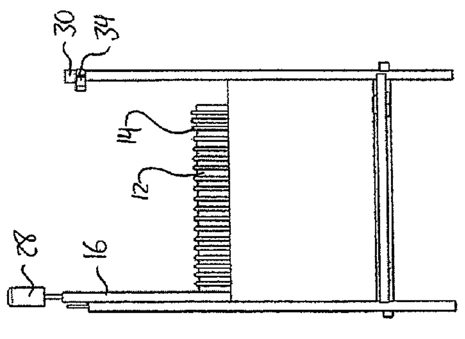
FIG. 2 is a side elevational view of the pipeline section of FIG. 1.

Referring to FIG. 2, a valve plate 20 is carried on the valve support 16 in a manner vertically displaceable upward and downward along the valve support 16 for movement between open and closed positions respectively revealing and occluding the respective end of the pipe 10. In the illustrated embodiment, two parallel worm shafts 22 are carried on the valve support 16 for rotation about respective vertical axes on opposite sides of the valve plate 20. Ball nuts 24 attached to the valve plate 20 at the opposing sides thereof respectively ride on the two worm shafts 22. A pair of rotational actuators 25 are configured to drive simultaneous and equal-velocity rotation of the worm shafts 22 in a same direction as one another, for example as achieved by driving of the two actuators by a single electric motor, whereby rotation in one direction raises the valve plate 20 to the open position and rotation in the opposite direction would lower the valve plate 20 to the closed direction via axial displacement of the ball nuts 24 on the worm shaft 22. Two tension coil springs 26 are respectively connected to the ball nuts to bias the same axially downward on the respective worm shafts, thereby biasing the valve plate toward the closed position. An emergency light 28 is mounted atop the valve support 16.

Figure 10:
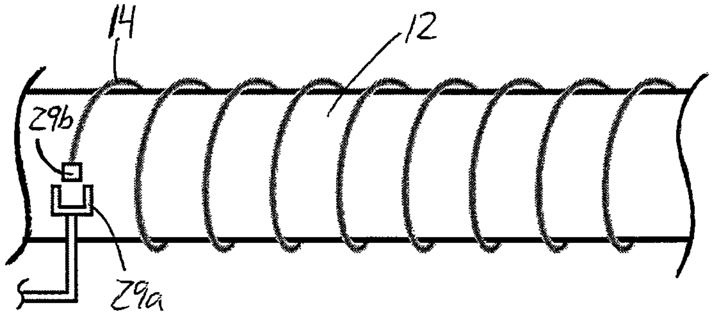
FIG. 10 is a schematically illustrates the connection of components in a control circuit of the leak containment and response system of the present invention.

A control circuit for conveying power to the electric motor of the actuators 25 features a quick-disconnect coupler **29*a* to which a terminal 29*b* at a respective end of the wire 14 is normally engaged, as schematically shown in FIG. 10, thereby conductively linking the wire to the motor. The other end of the wire is arranged to connect to a power source to deliver current through the wire to the motor for powering of the same. The motor is configured to rotate the two worm shaft actuators in a direction forcing the valve plate 20 into the open position against the bias of the springs 26 when current flows through the wire. Accordingly, so long as the control circuit remains closed by the engagement of the wire terminal with the quick-disconnect coupler, the valve plate 20 will be held in the open position. However, as soon as the wire terminal is pulled from its normal engagement with the quick-disconnect coupling, the resulting interruption of power to the motor causes the valve plate 20** to be quickly lowered to the closed position by the downward pulling force of the springs.

The above-described components cooperate to form a system that operates to perform three automated functions under the occurrence of a leak in the pipe 10, particularly to contain the fluid leaking from the pipe, automatically cut off flow through the pipe, and to inform pipeline monitoring personnel that a leak has occurred.

A power supply is connected to the wire coil 14 via the end of the wire opposite the valve, with the current through the wire coil 14 thus delivering power the actuator motor to hold the valve plate 20 in the open position so that flow through the pipeline is allowed to occur.

When a leak occurs, the fluid leaking from the pipe is contained by the flexible jacket 12 closing around the leaking portion of the pipe wall. In the event of a significant leak, the pressure of the fluid exiting the pipe cause the resiliently flexible jacket to radially expand, i.e. bulge or bubble outward, which in turn causes the wire coil 14 to expand in diameter at the location of this expansion or bulge in the jacket. This diameter enlargement of one or more winds of the coiled wire causes the terminal-equipped end of the wire to pull free from the quick-disconnect coupler, thus opening the control circuit and thereby breaking the power connection to the actuator motor, which causes the valve to close under the automatic action of the springs, thereby cutting off the fluid flow through the pipe.

The valve is located upstream from the respective wire 14 so that the closing of the valve stops further flow to the location of the leak, thereby limiting the extent of fluid that can escape the pipe. The fluid that has escaped is contained beneath the flexible jacket, and in the event of a leak in the flexible jacket, a secondary containment measure is provided by the catch basin 18, which spans at least a bottom half of the pipe circumference to catch fluid falling from the jacket. The drain plug 18 allows the basin captured fluid to later be drained when personnel arrive on site with oil pans or other suitable collection equipment than can be placed, or can reach, under the drain port of the basin.

In the event of a power loss, all valves on the pipeline will close prevent any further flow in the pipeline, thereby limiting the extent of any fluid that can escape the pipe. In a preferred embodiment, multiple valves and their respective jacket and coil are installed on the pipeline so and the valve actuators are wired in series via the respective coiled wires, whereby the coils create an overall control circuit powering all the valves in the series, and the interruption of the control circuit current by the disengagement of one coil's terminal at the respective valve thus causes all of the valves in the series to close.

The breaking of the control circuit to deactivate the motor and close the valve also activates the emergency light, for example by interrupting power to the control side of a relay in order to close the output side of the relay to form a connection between a secondary power supply and the emergency light 28.

In the occurrence of a leak, the system thus contains the leaking fluid inside the jacket, stops flow to the leak location by closing the valve, and provides a visual signal that the leak has occurred by activation of the emergency light. The system may employ a camera 30 to capture video or intermittent still images of one or more of the coil-wrapped jacket, the valve and the emergency light. Video or still images may be automatically forwarded to a monitoring device (e.g. computer workstation, laptop, tablet, mobile phone) that is accessible to, or carried by, one or more personal tasked with monitoring the status of the pipeline, whether by a wired or wireless communication link. The camera and associated communication link may configured for ongoing continuous or intermittent image capture and transmission, or be configured to capture and/or transmit images only when a leak occurs, for example having been activated in a manner similar to that described above for the emergency lights.

Additional monitoring equipment may include pressure and/or flow rate sensors 32 inside the pipe for monitoring internal conditions inside the pipeline, and/or a motion sensor 34 for monitoring movement of one or more of the jacket, wire coil or valve. Like the camera, the motion sensor may be normally operational, or event-triggered to only activate in emergency situations where a leak has occurred.

It will be appreciated that the pipe section configuration illustrated in FIG. 1 is preferably repeated in series along the pipeline, for example installing sleeves on sections of pipe prior to pipeline assembly, and then sealing the sleeves of different pipe sections together end-to-end during onsite assembly of the pipe sections to form the pipeline. This way, continuous jacket overlying a substantial length of the pipeline may be formed.

FIG. 4 schematically illustrates a pipeline of the present invention, where the pipeline 100 runs from a pumping station 102 to a ship-loading fill station 104 at a coastal port in order to convey the oil to a suitable location for filling of an oil tanker. The fill station 104 features a telescopic upright conduit 106 connected to an end of the pipeline 100 by a swivel fitting 108 that allows the upright conduit 106 to rotate about a vertical axis. A series of outlet pipes 110 are connected to the top of the vertically-adjustable telescopic conduit 106, and joined together by articulating joints 111 allowing the outlet pipes 110 to pivot relative to one another about horizontal axes. A valve-equipped connector 112 at the end of the series of articulated pipes 110 is equipped for threaded coupling with the fill pipe 114 of a of an oil tanker bladder or compartment 116. The swivel adjustment, telescopic height adjustment, and articulated outlet adjustments form a generally tap- or faucet-shaped pipeline outlet that is adjustable to suitable positions for connecting to the oil-receiving bladders or compartments of oil tankers.

Figure 3:
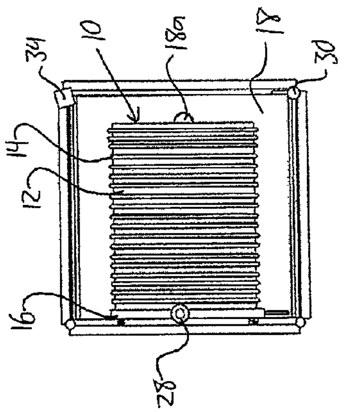
FIG. 3 is an overhead plan view of the pipeline section of FIG. 1.

The pipeline 100 features multiple sets of the valve, jacket and wire combination of FIGS. 1 to 3 arranged end-to-end in series along the pipeline. Each coil wire is connected in series to the next via the quick-disconnect coupler to which the coil wire's terminal is engaged, with opposite ends of the series connecting to respective terminals of a suitable power source, for example at the pumping station 102. In this wiring configuration, the disengagement of any one of the coiled wires from its quick-disconnect coupling under expansion of the coil diameter by a leak in the pipe will disconnect all the valves from the power supply, causing all the valves to close of the pipeline at their respective positions therealong. However, it will be appreciated that other embodiments may employ alternate wiring configurations in which not all of the valves are commonly controlled. For example, in some embodiments, each valve may be controlled individually, i.e. closed only by disconnection of its respective coil wire.

Figure 7:
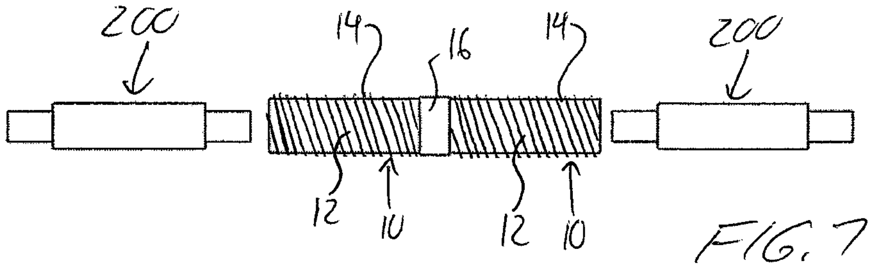
FIG. 7 is a schematic overhead plan view of pipeline sections featuring the addition of flashback arrestors to the leak containment and response system of FIG. 1.
Figure 8:
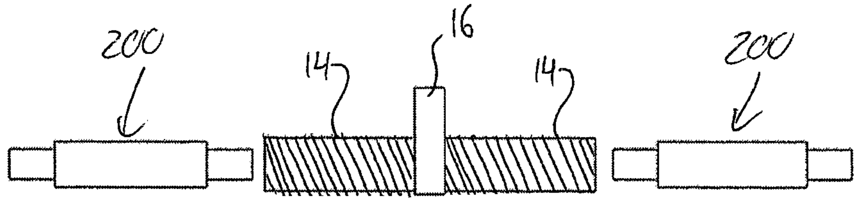
FIG. 8 is a schematic side elevational view of the pipeline sections, leak containment and response system, and flashback arrestors of FIG. 7.
Figure 9:
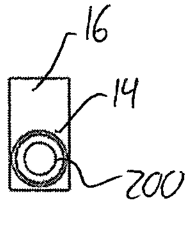
FIG. 9 is a schematic end elevational view of the pipeline sections, leak containment and response system, and flashback arrestors of FIG. 7.

FIGS. 7 to 9 illustrate two pipeline sections featuring a similar leak detection and containment solution to that outlined above with reference to FIG. 1, with the valve installed between adjacent ends of the two pipes 10 and a respective jacket 12 and coil 14 wrapped around each pipe to cause closing of the valve. The control circuit for the valve features two points at which the circuit can be opened by withdrawal of the end terminals of the coils from the circuit, whereby a leak in either pipe will expand the respective jacket and coil and the disengagement of this coils terminal from the circuit will open the same and cause the valve to automatically close.

The safety system in FIGS. 7 to 9 features the addition of a flashback arrestor 200 to each pipe 10 at the end thereof opposite the valve support 16 at which the cutoff valve 22 is mounted to these pipes to open and close flow therebetween, thus placing flashback arrestors both upstream and downstream of the valve To prevent explosions, for example at a tank of propane or natural gas fed by the pipeline, this new safety valve system has a flash back arrestor 200 both in front and the rear of the cutoff valve system. The front flash back arrestor would prevent flames or pressure back flow, the cutoff valve would stop the pipeline flow from continuing, and the rear flash back arrestor would be an extra safety flash back protection, for example in case the cutoff valve 22 might cause a spark when slammed closed in the event of a leak.

While the schematically illustrated embodiment employs a knife-style valve the slides in a radial direction relative to the pipe axis to open and close the pipe conduit, other valve configurations may be employed. In addition, while the illustrated embodiment uses powering of actuators to hold the valves in their normally open positions, other embodiments may be configured to reduce power consumption by avoiding the need for power to hold the valve open, and instead use power only to release or drive the valve out of the open position into the closed position. However, the described use of power to hold the valve open against a biasing action that forces the valve closed may provide an improved failsafe by automatically closing the valves in the event of a power disruption.

It will be appreciated that although the coiled wire of the detailed embodiment is used to convey power to the valve control mechanism, other embodiments may power the gate control circuit in another way, for example using a dedicated power supply at the location of the valve, with the terminal of the coiled wire forming part of a switching mechanism for changing the open/closes state of the control circuit between the dedicated power supply and the valve actuator, without delivering current to the circuit through the coil. In such embodiments, the coil need not necessarily be wire or other electrically conductive member.

While the illustrated embodiment is described in terms of an oil pipeline, it will be appreciated that the same leak containment, flow cutoff and personnel informing leak-indication solutions can be employed on pipelines or conduits used in other contexts.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A leak detection, containment and cutoff system for a conduit, the system comprising:

a flexible tubular jacket fitted circumferentially and conformingly around a circumferential wall of the conduit, said flexible tubular jacket comprising resilient material that provides said flexible tubular jacket with a resilient expandability in a radial direction of the conduit so that said flexible tubular jacket is expandable in said radial direction by fluid exiting the conduit in the event of a leak occurring in the conduit at a location beneath the flexible tubular jacket;

a valve installed at a point along the conduit and moveable between open and closed positions allowing and preventing fluid flow through the conduit at said point; and a control system configured to cause movement of the valve into the closed position under expansion of the tubular jacket by the fluid leaking from the conduit, whereby said movement of the valve into the closed position terminates the leak; and wherein the flexible tubular jacket is configured such that the resilient expandability in the radial direction acts to contain said fluid inside the flexible jacket throughout an entire duration of the leak.

2. The system of claim 1 in combination with the conduit, wherein the conduit is an oil pipeline.

3. The system of claim 1 wherein the valve is one of multiple valves installed at respective locations along the conduit, and the control system is configured to close all of the multiple valves under the expansion of the tubular jacket by the fluid leaking from the conduit.

4. The system of claim 1 wherein the control system comprises a coil wrapped around and along the flexible tubular jacket and having a terminal fitting at an end thereof, the terminal fitting normally residing in a first relationship with a control element in a control circuit of the control system and being movable into to a second relationship with the control element by expansion of a diameter of the coil caused by the expansion of the tubular jacket at the leak in the conduit, the terminal fitting and the control element being arranged to maintain the valve in the open position when in the first relationship and to move the valve to the closed position when in the second relationship.

5. The system of claim 4 wherein the control element is a quick-disconnect coupler in which the terminal fitting of the coil is normally engaged to close the control circuit and from which the terminal fitting is disengagable from the quick-disconnect coupler by the expansion of the coil to open the control circuit, the control system being configured to move the valve into the closed position under opening of the control circuit.

6. The system of claim 5 wherein the control circuit normally powers at least one actuator that normally holds the valve in the open position, whereby opening of the control circuit disconnects power to the at least one actuator to release the valve from the open position.

7. The system of claim 1 comprising an emergency alarm system linked to the control system and operable to activate at least one alarm output in response to the expansion of the tubular jacket and resulting closing of the valve.

8. The system of claim 7 wherein the at least one alarm output comprises an emergency indicator light.

9. The system of claim 7 wherein the at least one alarm output comprises an image capture device arranged to capture at least one image of at least one of the tubular jacket and the valve.

10. The system of claim 1 comprising a flashback arrestor installed on the conduit proximate the valve.

11. The system of claim 10 comprising a second flashback arrestor installed on the conduit proximate the valve, the flashback arrestors being respectively positioned upstream and downstream of the valve.

12. The system of claim 10 wherein flashback arrestor is mounted at an end of a pipe that is disposed opposite another end of the pipe at which the valve is mounted between said pipe and another pipe of the conduit.

13. A leak detection and containment system for a conduit, the system comprising:

a flexible tubular jacket fitted circumferentially and conformingly around a circumferential wall of the conduit, said flexible tubular jacket comprising resilient material that provides said flexible tubular jacket with a resilient expandability in a radial direction of the conduit so that said flexible tubular jacket is expandable in said radial direction by fluid exiting the conduit in the event of a leak occurring in the conduit at a location beneath the flexible tubular jacket;

a coil wrapped around and along the flexible tubular jacket and having a terminal fitting at an end thereof; and a leak event response system comprising a control circuit having a control element in association with the terminal fitting of the coil, the terminal fitting normally residing in a first relationship with a control element and being movable into to a second relationship with the control element by expansion of a diameter of the coil caused by the expansion of the tubular jacket at the leak in the conduit, the leak response system being configured to trigger and output action under movement of the terminal fitting of the coil into the second relationship with the control element;

wherein the flexible tubular jacket is configured such that the resilient expandability in the radial direction acts to contain said fluid inside the flexible jacket throughout an entire duration of the leak.

14. The system of claim 13 wherein the leak event response system comprises a valve installed at a point along the conduit and moveable between open and closed positions allowing and preventing fluid flow through the conduit at said point, the valve being normally maintained in the open position and arranged to move to the closed position under movement of the terminal fitting of the coil into the second relationship with the control element.

15. The system of claim 13 wherein the leak event response system comprises an emergency alarm system arranged to activate under movement of the terminal fitting of the coil into the second relationship with the control element.

16. A leak detection and indication system for a conduit comprising a flexible tubular jacket fitted circumferentially and conformingly around a circumferential wall of the conduit, said flexible tubular jacket comprising resilient material that provides said flexible tubular jacket with a resilient expandability in a radial direction of the conduit so that said flexible tubular jacket is expandable by fluid exiting the conduit in the event of a leak occurring in the conduit at a location beneath the tubular jacket, whereby expansion of the flexible tubular jacket indicates the occurrence of the leak while the resilient expandability in the radial direction acts to contain said fluid inside the flexible jacket during said expansion.

17. The system of claim 16 further comprising a leak event response system arranged to automatically carry out an output under expansion of the flexible tubular jacket by the leak.

* * * * *